US008693896B2

(12) United States Patent
Breunig et al.

(10) Patent No.: US 8,693,896 B2
(45) Date of Patent: Apr. 8, 2014

(54) METHOD AND DEVICE FOR PROCESSING TERAHERTZ WAVES

(75) Inventors: Ingo Breunig, Bonn (DE); Karsten Buse, Bonn (DE); Jens Kiessling, Bonn (DE); Bastian Knabe, Bonn (DE); Rosita Sowade, Bonn (DE)

(73) Assignee: Deutsche Telekom AG, Bonn (DE)

( * ) Notice: Subject to any disclaimer, the term of this patent is extended or adjusted under 35 U.S.C. 154(b) by 682 days.

(21) Appl. No.: 12/936,565

(22) PCT Filed: Feb. 3, 2009

(86) PCT No.: PCT/DE2009/000151
§ 371 (c)(1),
(2), (4) Date: Dec. 28, 2010

(87) PCT Pub. No.: WO2009/127177
PCT Pub. Date: Oct. 22, 2009

(65) Prior Publication Data
US 2011/0110674 A1 May 12, 2011

(30) Foreign Application Priority Data
Apr. 15, 2008 (DE) .......................... 10 2008 019 010

(51) Int. Cl.
*H04B 10/06* (2011.01)
(52) U.S. Cl.
USPC ............. 398/204; 398/187; 398/115; 398/91; 398/85
(58) Field of Classification Search
USPC ......... 398/172, 115, 180, 182, 140, 202, 204, 398/187, 91, 85
See application file for complete search history.

(56) References Cited

U.S. PATENT DOCUMENTS

| | | | | |
|---|---|---|---|---|
| 5,847,853 | A * | 12/1998 | Farnworth | ...................... 398/91 |
| 6,304,355 | B1 * | 10/2001 | Farnworth | ..................... 398/201 |
| 6,873,405 | B2 * | 3/2005 | Kido et al. | ..................... 356/121 |
| 7,054,339 | B1 * | 5/2006 | Hu et al. | .......................... 372/12 |
| 7,092,645 | B1 | 8/2006 | Sternowski | |
| 7,259,859 | B2 * | 8/2007 | Pepper | ........................... 356/451 |
| 8,035,083 | B1 * | 10/2011 | Kozlov et al. | .............. 250/341.1 |
| 8,373,921 | B2 * | 2/2013 | Ridgway | ....................... 359/279 |

(Continued)

FOREIGN PATENT DOCUMENTS

WO  WO 2005125060 A1  12/2005

OTHER PUBLICATIONS

Agrawal, Fiber-Optic Communication Systems, Third Edition, John Wlley & Sons, 2002, ISBN:0-471-21571-6, S.339-342 S.339,Fig.8 7.

(Continued)

*Primary Examiner* — Daniel Washburn
*Assistant Examiner* — Hibret Woldekidan
(74) *Attorney, Agent, or Firm* — Leydig, Voit & Mayer, Ltd.

(57) ABSTRACT

A method for processing received electromagnetic radiation includes receiving electromagnetic radiation having a plurality of carrier waves in the frequency range between 0.1 and 10 terahertz and having modulated onto the carrier waves information with a signal frequency of less than 50 GHz. The received radiation is filtered with a filter that is tunable in the frequency range from 0.1 to 10 terahertz so as to obtain at least one carrier wave as a terahertz signal. The terahertz signal is provided to a detection circuit that is sensitive to the terahertz signal frequency.

9 Claims, 1 Drawing Sheet

(56) References Cited

U.S. PATENT DOCUMENTS

| | | | | |
|---|---|---|---|---|
| 8,554,083 | B2* | 10/2013 | Breunig et al. | 398/157 |
| 8,554,085 | B1* | 10/2013 | Yap et al. | 398/183 |
| 8,565,641 | B2* | 10/2013 | Hashimoto | 399/113 |
| 2002/0036814 | A1* | 3/2002 | Mueller et al. | 359/180 |
| 2003/0090767 | A1* | 5/2003 | Yap et al. | 359/181 |
| 2007/0133987 | A1* | 6/2007 | Xu et al. | 398/67 |
| 2008/0075464 | A1* | 3/2008 | Maleki et al. | 398/85 |
| 2008/0152360 | A1* | 6/2008 | Bennett | 398/204 |
| 2008/0159342 | A1* | 7/2008 | McCaughan et al. | 372/21 |
| 2008/0212974 | A1 | 9/2008 | Davies et al. | |
| 2009/0263137 | A1* | 10/2009 | Hossein-Zadeh et al. | 398/115 |
| 2011/0142452 | A1* | 6/2011 | Michaels et al. | 398/115 |

OTHER PUBLICATIONS

Fitch et. al., Terahertz Waves for Communications and Sensing, Johns Hopkins APL Technical Dijst 2004, vol. 25,No. 4,S.348-355S. 348,Abstract,S.350,li.Sp.,vorl,Abs.

International Search Report for PCT/DE2009/000151 mailed on May 6, 2010.

Jewell et al., Tuneable Fabry-Perot Etalon for Terahertz Radiation, New Journal of Physics, 20080306 Institute of Physics Publishing, Bristol., GB—ISSN 1367-2630, vol. 10, Nr:33012, pp. 1-6, XP002577174.

Mangeney et. al., Continuous wave terahertz generation up to 2THz by photomixing on ion irradiated In0.53Ga0.47As at 1.55 μm wavelengths, Applied Physics Letters 91, 241102, 2007.

* cited by examiner

US 8,693,896 B2

METHOD AND DEVICE FOR PROCESSING TERAHERTZ WAVES

CROSS-REFERENCE TO RELATED APPLICATIONS

This application is a U.S. National Phase application under 35 U.S.C. §371 of International Application No. PCT/DE2009/000151, filed on Feb. 3, 2009 and claims benefit to German Patent Application No. 10 2008 019 010.1 filed on Apr. 15, 2008. The International Application was published in German on Oct. 22, 2009 as WO 2009/127177 A2 under PCT Article 21(2).

FIELD

The invention concerns a method for processing received electromagnetic radiation, having multiple carrier waves in the frequency range between 0.1 and 10 terahertz and having information with a signal frequency of less than 50 GHz, in particular less than 1 GHz, modulated onto the carrier waves. The invention also concerns a receiver device for implementing the method.

BACKGROUND

Since the time approximately 100 years ago when first technologies for wireless data transmission began to be employed, the bandwidth available for transmission has grown continuously. As is known, the width of the frequency band that can be used for transmission depends on the carrier frequency, so that as the frequency increases, the transmission bandwidths available also increase. Nowadays, carrier frequencies in the range from a few kilohertz to many gigahertz are used. Thus, so-called "wireless HD" operates with a carrier frequency of 60 GHz and bandwidths of 4 Gbit/s. In order to be able to achieve data rates in the range of 10 Gbit/s and higher, waves in the terahertz range will also be used as carriers in the future.

A problem in data transmission by means of such terahertz waves is that electronic circuits are limited to processing speeds below 100 GHz=0.1 THz on account of the lifetime of free electrons and holes, and thus do not come into consideration for processing such high frequencies in the aforementioned terahertz range. Instead, optical methods are known, which mostly employ frequency mixing in order to reach the terahertz range in question from the range of visible light. These methods are relatively complicated.

SUMMARY

In an embodiment, the present invention provides a method for processing received electromagnetic radiation. The method includes receiving electromagnetic radiation having a plurality of carrier waves in the frequency range between 0.1 and 10 terahertz and having modulated onto the carrier waves information with a signal frequency of less than 50 GHz. The received radiation is filtered with a filter that is tunable in the frequency range from 0.1 to 10 terahertz so as to obtain at least one carrier wave as a terahertz signal. The terahertz signal is provided to a detection circuit that is sensitive to the terahertz signal frequency.

DETAILED DESCRIPTION

Figure 1:
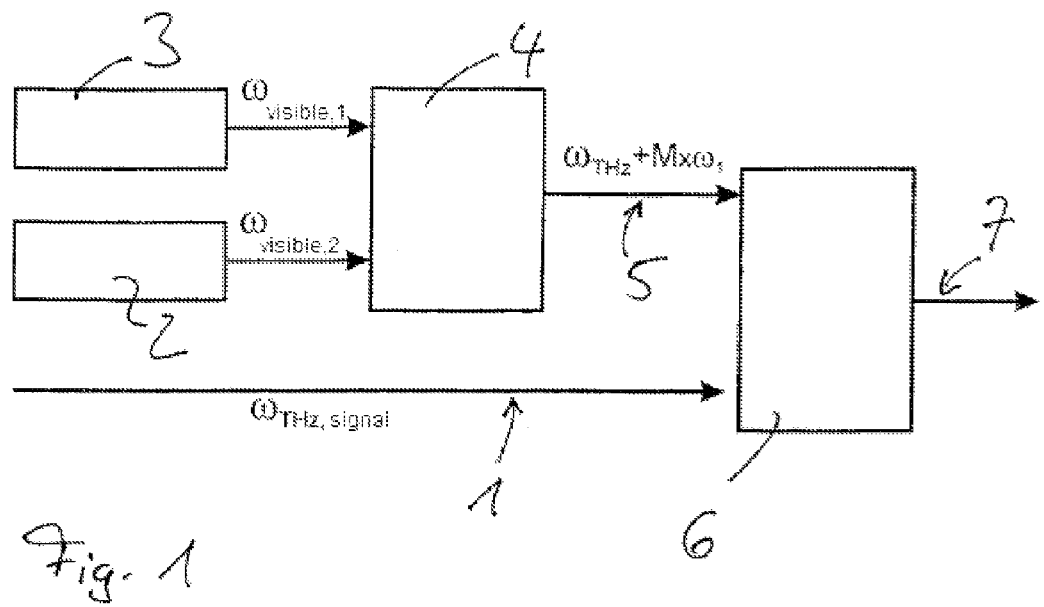
FIG. 1 illustrates a device with tunable terahertz local oscillator according to one embodiment of the invention.

Embodiments of the invention provide a method with which received electromagnetic radiation containing a plurality of terahertz waves or channels can be processed such that the signal frequency can be received and processed by a simple detector. Additional embodiments of the invention to create a receiving device for implementing the method.

One embodiment of the invention includes filters that are tunable in the frequency range between 0.1 and 10 terahertz, with which it is possible to filter out, from all carrier waves or channels in the terahertz range that are present in the room and available for data transmission, precisely one carrier wave that can then be processed further with a downstream device. First of all, the tunable filter thereby offers the possibility of selecting precisely one particular transmission channel among the many that may be present. In this regard, the tunable filter can be implemented by means of two different concepts:

In one first embodiment, a reference wave that is tunable in its frequency in the frequency range from 0.1 to 10 terahertz is generated in the filter. This wave is tuned to the frequency of the carrier wave or the channel to be received, wherein the tuning takes place by the means that the reference wave and the carrier waves are demodulated in their frequencies by frequency mixing, in particular by difference frequency mixing, so that after demodulation only the signal frequency impressed as modulation remains. This frequency can then be examined in a relatively simple device for the detection of such frequencies, which in particular employs an electronic circuit.

The tunable reference wave, with a frequency of $\omega_{THz,reference}$, can itself be generated by frequency mixing from two waves of frequencies $\omega_{visible,1}$, and $\omega_{visible,2}$. With this reference wave, the arriving electromagnetic radiation $\omega_{THz,signal}$ in the terahertz range is examined by, in effect, sampling for the presence of resonances. To this end, a further frequency mixing with the frequencies $\omega_{THz,reference}$ and $\omega_{THz,signal}$ is carried out. At the moment when a resonance is detected, which is to say when $\omega_{THz,reference}$ and $\omega_{THz,signal}$ are equal, only the signal frequency that can be electronically processed remains as the difference signal. To a certain degree, the resonances thus represent the individual transmission channels with the carrier frequencies $\omega_{THz}$ M×$\omega_1$, where $\omega_{THz}$ represents the fundamental frequency of the terahertz wave, $\omega_1$ represents the frequency spacing between two channels, and M represents the number of a channel, where M takes on values between 1 and N, and N is the total number of channels.

This way of proceeding can be compared with the principle of a radio receiver that is tuned for reception of a carrier frequency and can then receive signals modulated onto this carrier frequency and convert them for output. In this manner according to an embodiment of the invention a receiver of simple design, and which is correspondingly economical, can be created for selective reception of terahertz waves.

In this regard, in a special embodiment the reference wave can be generated by means of frequency mixing of a fundamental wave, having a frequency greater than 0.1 THz generated by optical means, and a complementary wave in the frequency range below 0.1 THz generated by electronic means. The fundamental wave and complementary wave are in turn combined using frequency mixing means to form the reference wave. This embodiment can be advantageous because the generation and control of the frequency of the complementary wave using electronic means is sometimes simpler.

Thus, it is the fundamental wave of frequency $\omega_{Thz}$ that is generated, while the complementary wave of frequency $N \times \omega_1$ is electronically adjusted. For example, an electronic local oscillator can generate an electrical complementary signal at the frequency $M \times \omega_1$, which is added to the frequency of the optically generated fundamental wave and is then used for difference frequency generation. The remaining relatively low-frequency amplitude modulation is then the information from the channel M. Even if no amplitude modulation is present, with other modulation methods in which the frequency, phase, and/or polarization is modulated, only the last step of signal analysis is different. Typical values are $\omega_1 = 100$ MHz and N=128.

In the other, second embodiment, an optical filter for terahertz light is created, which selects one terahertz wave. A tunable Fabry-Perot resonator, which extracts one carrier wave at a time out of the spectrum that is present, is used as a filter for this purpose. This wave is then detected using a suitable terahertz detector. The method of operation of the Fabry-Perot resonator and the filter implemented therewith are described in detail in the example embodiment.

Embodiments of the invention are explained below with reference to FIGS. 1 and 2.

Shown in FIG. 1 is the first method mentioned for processing electromagnetic radiation. This radiation includes multiple carrier waves in the frequency range from 0.1 to 10 terahertz, as well as the information, having a signal frequency of below 50 GHz, that is modulated onto each of the carrier waves. Also among all of these frequencies is the one signal radiation 1 with a frequency of $\omega_{THz,signal}$ to which the receiver is to be selectively adjusted.

For this selective adjustment, the method employs, firstly, two distributed-feedback lasers (DFB lasers) 2 and 3, with which a tunable terahertz local oscillator is implemented. The two DFB lasers are used to generate the two laser beams with frequencies $\omega_{visible,1}$ and $\omega_{visible,2}$, wherein these frequencies are altered by varying the temperatures of the lasers. In the module 4, the two laser beams are subjected to a first difference frequency mixing, resulting in a reference wave 5 with a frequency $\omega_{Thz} + M \times \omega_1$. The frequency of the reference wave 5 is in the range from 0.1 to 10 terahertz. It is also possible to generate the reference wave from a frequency mixing of a fundamental wave that is generated optically, for example by means of the DFB laser, and an electronically generated complementary wave.

Next, the reference wave 5 is provided to a second difference frequency mixing 6, together with the signal radiation 1, wherein the mixing radiation 7 is received by a detector that is not shown. If the frequency of the carrier wave $\omega_{THz,signal}$ exactly matches the frequency of the channel M, thus is equal to $\omega_{THz} + M \times \omega_1$ then only the signal frequency modulated on the signal radiation 1 remains. Thus, the frequency $\omega_{THz}$ $M \times \omega_1$ of the reference wave is subtracted from the signal radiation 1 in order to obtain the signal channel 7 of the channel number M. This signal channel is then detected as the signal by a detection method that is sensitive to the signal frequency.

Alternatively, the DFB lasers 2 and 3 in combination with the mixer 4 can also generate a terahertz wave of frequency $\omega_{THz}$. After the mixer 6, the frequencies $\omega_1, 2 \times \omega_1, \ldots, N \times \omega_1$ are then present in the signal channel 7. If N and $\omega_1$ are chosen such that the frequency $N \times \omega_1$ can still be processed electronically, then detection electronics that are not shown can read out the information from the individual M channels.

In this context, the combination of the light from two laser diodes to create terahertz light is known from the literature, for example from J. Mangeny, A. Merigault, N. Zerounian, P. Crozat, K. Blary and J. F. Lampin, Applied Physics Letters 91, 241102 (2007), and is employed, for example, in radio astronomy to demodulate terahertz signals from space. A continuous input spectrum is present there, however. In contrast, the purpose of the method is to precisely reach the frequency $\omega_{THz}$ $M \times \omega_1$. In addition, each one of the N channels that the terahertz signal 1 transmits can possess information about its channel number. This then makes it unnecessary for the receiver to determine the absolute difference frequency of the laser by independent measurement, which represents a significant simplification.

Figure 2:
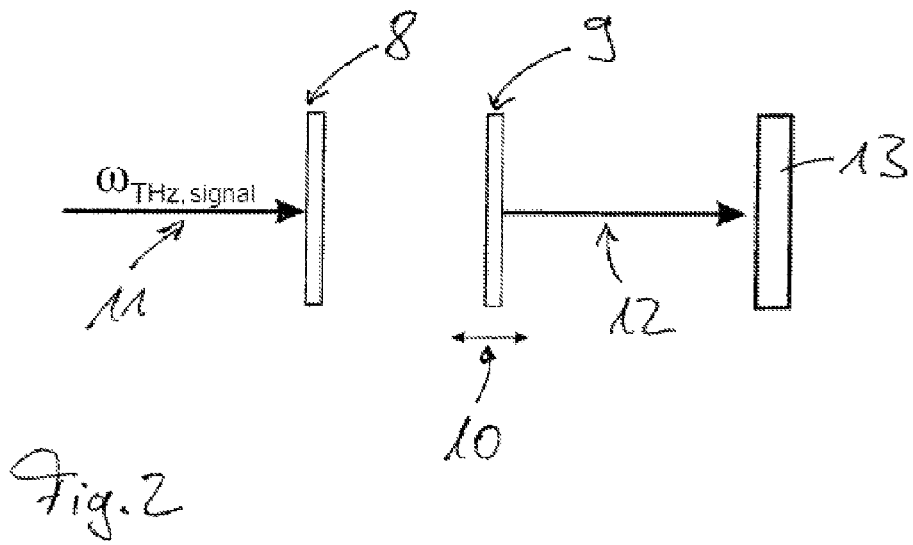
FIG. 2 illustrates a Fabry-Perot interferometer according to one embodiment of the invention.

The second device for filtering out terahertz waves, shown in FIG. 2, utilizes a Fabry-Perot interferometer known from optics. This has two mirrors 8 and 9, of which one mirror 9 is mounted on a translator (double arrow 10), so that the spacing between the mirrors 8 and 9 can be changed. However, the terahertz wave 11 to be analyzed by the receiver can only pass through the two mirrors 8 and 9 if the spacing of the mirrors is an integer multiple of half the wavelength of the terahertz wave 11. All other carrier frequencies are reflected by the device. This condition is only satisfied for one frequency channel at a time if the mirrors 8 and 9 have high enough reflectivity that the selectivity of the Fabry-Perot resonator is better than the frequency spacing $\omega_1$ of two terahertz channels. The signal 12 for the channel M that is obtained can then be provided to a terahertz detector 13. This detector can consist of a light source, a frequency sum mixing, and a semiconductor detector. Alternatively, a so-called photo mixer could be used as detector.

In contrast to the arrangement shown in FIG. 1, the actual terahertz wave is not demodulated here, so that a detector is required that can directly detect the terahertz wave. Detectors based on thermal principles (Golay cells, bolometers) are too slow to permit high-bandwidth data transmission. The embodiment described above for the terahertz detector solves this problem, since a semiconductor detector is used in the end. As is known, such detectors have high detection bandwidths; up to 40 GHz can easily be reached.

In this case too, it can be advantageous if each channel contains an identification signal that is integrated in the data stream and that specifies the number of the channel or its frequency. If the receiver does not possess the necessary absolute frequency accuracy, the desired channel can be identified unambiguously with the aid of this signal when scanning the frequencies.

A suitable receiving device for electromagnetic radiation of the cited type thus comprises a filter module tunable in the frequency range between 0.1 and 10 terahertz, in particular in the manner of a tunable terahertz local oscillator or of a Fabry-Perot interferometer, and a detector located thereafter that is sensitive to the signal frequency.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for processing received electromagnetic radiation, the method comprising:
   receiving electromagnetic radiation having a plurality of carrier waves in the frequency range between 0.1 and 10 terahertz and having modulated onto the carrier waves information with a signal frequency of less than 50 GHz; and
   filtering the received radiation with a filter that is tunable in the frequency range from 0.1 to 10 terahertz so as to obtain signal radiation carried by at least one carrier wave of the plurality of carrier waves, wherein the filtering comprises:
      generating a first wave with a first frequency and a second wave with a second frequency;
      frequency-mixing the first wave with the second wave so as to generate a reference wave corresponding to the at least one carrier wave carrying signal radiation; and
      frequency-mixing the reference wave with the at least one carrier wave carrying signal radiation so as to generate an output signal corresponding to the signal radiation carried by the at least one carrier wave; and
   providing the output signal to a detection circuit that is sensitive to at least one frequency corresponding to the output signal.

2. The method of claim 1, wherein frequency-mixing the reference wave with the at least one carrier wave is performed by a demodulation circuit.

3. The method of claim 2 wherein the first wave is a fundamental wave generated by an optical device and the second wave is a complementary wave generated by an electronic device.

4. The method of claim 2 wherein the first and second waves are generated by at least two lasers.

5. The method of claim 4 wherein the at least two lasers are semiconductor lasers.

6. The method of claim 3 wherein the first and second waves are generated by at least two distributed-feedback lasers that are operated at different adjustable temperatures.

7. The method according to claim 1, further comprising:
   identifying at least one data channel.

8. The method of claim 1 wherein the frequency of the signal radiation is less than 1 GHz.

9. A receiver device for receiving electromagnetic radiation having multiple carrier waves in the frequency range from 0.1 to 10 terahertz modulated with information having a signal frequency of below 50 GHz, the receiver device comprising:
   a filter module tunable in the frequency range between 0.1 and 10 terahertz, the filter module comprising:
      first and second wave sources for generating a first wave with a first frequency and a second wave with a second frequency;
      a frequency mixer for frequency-mixing the first wave with the second wave so as to generate a reference wave corresponding to at least one carrier wave carrying signal radiation; and
      a demodulator for frequency-mixing the reference wave with the at least one carrier wave carrying signal radiation to generate an output signal corresponding to the signal radiation carried by the at least one carrier wave; and
   a detector connected downstream of the filter module, the detector being sensitive to a at least one frequency corresponding to the output signal.

* * * * *